(12) United States Patent
Remo

(10) Patent No.: US 9,125,522 B2
(45) Date of Patent: Sep. 8, 2015

(54) COFFEE MACHINE WITH SYSTEM FOR PRODUCING COLD COFFEE

(75) Inventor: Gianni Remo, San Marcello Pistoiese (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1180 days.

(21) Appl. No.: 13/119,646

(22) PCT Filed: Sep. 18, 2009

(86) PCT No.: PCT/IT2009/000424
§ 371 (c)(1),
(2), (4) Date: Mar. 17, 2011

(87) PCT Pub. No.: WO2010/035302
PCT Pub. Date: Apr. 1, 2010

(65) Prior Publication Data
US 2011/0171350 A1 Jul. 14, 2011

(30) Foreign Application Priority Data
Sep. 24, 2008 (IT) .................. FI2008A0182

(51) Int. Cl.
A23F 5/00 (2006.01)
A47J 31/54 (2006.01)
A47J 31/50 (2006.01)
F25D 3/02 (2006.01)
F25D 31/00 (2006.01)

(52) U.S. Cl.
CPC . *A47J 31/50* (2013.01); *F25D 3/02* (2013.01); *F25D 31/002* (2013.01)

(58) Field of Classification Search
CPC ........... A47J 31/50; F25D 31/002; F25D 3/02
USPC .............. 99/286–295, 323.3; 426/77; 62/430, 62/437, 3.6
See application file for complete search history.

(56) References Cited

U.S. PATENT DOCUMENTS

| | | | |
|---|---|---|---|
| 4,416,194 A * | 11/1983 | Kemp | 99/275 |
| 4,649,809 A * | 3/1987 | Kanezashi | 99/290 |
| 5,235,902 A | 8/1993 | Ogawa et al. | |
| 5,724,883 A * | 3/1998 | Usherovich | 99/290 |
| 6,192,785 B1 * | 2/2001 | Trida et al. | 99/284 |
| 6,460,735 B1 * | 10/2002 | Greenwald et al. | 222/146.1 |
| 2002/0130137 A1 | 9/2002 | Greenwald et al. | |
| 2003/0051488 A1 * | 3/2003 | Chiusolo | 62/99 |
| 2007/0017378 A1 | 1/2007 | Takizawa et al. | |

FOREIGN PATENT DOCUMENTS

| | | |
|---|---|---|
| CN | 201005503 Y | 1/2008 |
| JP | 1123124 A | 1/1999 |
| JP | 2000300438 A | 10/2000 |
| JP | 2007181479 A | 7/2007 |
| JP | 3143319 U | 6/2008 |

\* cited by examiner

*Primary Examiner* — Jianying Atkisson

(57) ABSTRACT

A coffee machine includes a boiler, a pump, and an infusion unit for producing coffee. Further, an auxiliary circuit is connectable to the output of the infusion unit for the production of cold coffee.

15 Claims, 3 Drawing Sheets

COFFEE MACHINE WITH SYSTEM FOR PRODUCING COLD COFFEE

TECHNICAL FIELD

The present invention concerns improvements to coffee machines, and, more in particular, although not exclusively, to coffee machines of the automatic or semi-automatic type for household, professional or commercial use. In general, within the scope of the present description and of the attached claims, "coffee machines" mean also an automatic dispenser, or vending machine, suitable to supply one or more beverages, among which coffee, and furthermore suitable, as the case may be, to dispense solid food products.

STATE OF THE ART

Both in the field of so-called vending machines or automatic dispensers, and in the field of professional or household machines, machines and devices are well known of the automatic or semi-automatic type for preparing beverages of various type, in particular for preparing coffee based beverages, such as espresso, American coffee or the like. In the field of vending machines there are also known machines that are designed to deliver hot and cold beverages. Vending machines are for example known for delivering coffee, cappuccino, milk, chocolate, or other hot beverages and fruit juices or other cold beverages.

In the household and professional field machines are well known, which usually supply only hot beverages, produced from single serving pods, capsules or cartridges, or from loose powder, or also from coffee powder obtained through the extemporary grinding of coffee beans contained in a housing combined with a coffee grinder.

The coffee based beverage is prepared through infusion with hot water and is supplied at a high temperature.

SUMMARY OF THE INVENTION

According to one aspect, the present invention provides for a coffee machine, i.e. in general any machine suitable to supply coffee and, as the case may be, other beverages and/or other food and non-food products, which also allows the production of cold coffee. Characteristically, according to the present invention, the machine includes an auxiliary circuit, which can be directly or indirectly connected to the outlet of the coffee infusion unit which is designed for producing cold coffee. The cold coffee can be delivered as is, or mixed with or added to other products so as to obtain other types of coffee-based beverages.

In some embodiments, the machine is characterized by a refrigerating cartridge, which can be associated to the infusion unit, for example a cartridge which can be connected to the auxiliary circuit by means of a switching valve. This latter can be so designed as to connect the outlet of the coffee infusion unit alternatively to the coffee dispensing nozzle of the machine or to the refrigerating cartridge.

In this way it is possible to select the production and supply of hot coffee through the normal members of the machine, i.e. the infusion unit and the dispensing nozzle, or the production of cold coffee by switching the switching valve in such a manner that the hot coffee produced by the infusion unit passes through the refrigerating cartridge and exits therefrom at a substantially reduced temperature, and in general at a temperature lower than the ambient temperature. Supply can take place through the same dispensing nozzle of the machine provided for the supply of hot coffee, or through a separate nozzle, or directly from the refrigerating cartridge.

According to some embodiments, the refrigerating cartridge is a passive system, i.e. a system wherein a cold accumulating mean, typically a gel, is maintained into contact with heat exchanging means, for example a coil or other flow conduit for the coffee. In this case the cartridge can be housed inside a deep freezer for a time sufficient to extract heat from the gel or other cold accumulating means and to bring it to low temperature. These gels or other cold accumulating substances are known and they are used in several applications, for example they are inserted in containers designed to be introduced in coolers for preserving and transporting foods.

Once the cartridge has stayed inside the deep freezer for the necessary time, it can be used for the production of cold coffee, by connecting it to the supply conduit for supplying the coffee coming from the infusion unit of the machine, so that the hot coffee flows through the coil or other conduit in thermal contact with the gel or other cold accumulating means or material. This latter absorbs the heat of the coffee, so that at the outlet of the coil the latter is at a temperature substantially lower than the initial temperature, and preferably substantially lower than the ambient temperature, for example at a temperature lower than 15° C. and preferably lower than 10° C.

It is also possible to produce single-use refrigerating cartridges, wherein the cold accumulating mean is formed by a substance which, actuated for example mechanically, absorbs heat. Substances of this type are known per se and they are commonly indicated with the term "synthetic ice". They are generally used for self-medication purposes, for treating hematomas, reducing swelling and pain due to dental interventions or the like. These materials are packaged in envelops that, adequately shaken or in any way subjected to a mechanical stress, actuate a reaction which entails the absorption of ambient heat. By using these substances inside the single-use cartridge it is possible to actuate the chemical reaction inside the mass of material contained in the cartridge in thermal contact with the flow conduit of the coffee. In this way the same effect is substantially obtained as the effect which can be obtained with a passive cartridge, in which the cold accumulating mean can be cooled inside a deep freezer and which therefore can be re-used several times.

According to other embodiments, the cartridge is of a semi-passive or active type, i.e. it can include or it can be combined with a refrigerating system that removes heat by absorbing energy, for example electric power.

The cartridge can be provided, for example, with systems that absorb at least partially the heat released by the coffee flowing through the cartridge. In some embodiments these heat absorption systems can include electric systems, typically one or more Peltier cells, that can be electrically powered through a plug, with which the coffee machine is provided. In this case the cartridge can be inserted on the machine by connecting the coffee inlet (and the coffee outlet, as the case may be) to the machine and the electric contacts for powering the Peltier cells to electric connectors provided on the machine.

In other embodiments a housing can be provided inside the machine, inside which the cartridge is at least partially inserted. The housing can be provided with heat absorption means, for example Peltier cells that, in this case, are part of the machine and not of the cartridge. The cells can be actuated e.g. simply when the cartridge is inserted, also in an automatic manner by the pressure onto a micro-switch arranged inside the housing and actuated by the cartridge when it is inserted in and connected to the coffee inlet and/or coffee outlet conduits.

In some embodiments the heat removing means can be dimensioned in such a manner that the cartridge can be lacking in cold accumulating means. In this case all the heat is removed from the coffee flowing across the cartridge by means of the active refrigerating systems associated to the cartridge and/or to the housing of the cartridge inside the machine. However, the refrigerating means associated with the cartridge and/or the housing of the cartridge in the machine are preferably used in combination with cold accumulating substances inside the cartridge. In this case the cartridge can be put in the deep freezer and maintained inside it for the time necessary to accumulate a sufficient quantity of cold, i.e. for the time necessary to extract heat in a sufficient quantity from the cold accumulating substance contained inside the cartridge. For the use, the cartridge is extracted from the deep freezer and connected to the machine. The active refrigerating means are actuated to limit the ambient heat absorption by the cold accumulating substance contained inside the cartridge and/or to contribute to the removal of heat from the coffee flowing in the cartridge in combination with the refrigerating effect of the cold accumulating substance contained in the cartridge.

According to some embodiments, in particular in the case of vending machines or automatic dispensers already provided with a fluid refrigerating circuit, it is possible to associate to the housing of the cartridge a heat exchanger fed with coolant coming from the refrigerating group with which the automatic dispenser or vending machine is already provided, instead of a Peltier cell system. In this case it is preferable that the cartridge does not require to be cooled inside a deep freezer, but it will stay in an almost permanent manner inside the machine as it will be maintained at the required temperature for the production of coffee by the refrigeration circuit of the machine. In any way, it is possible to provide cold accumulating materials or cold accumulating substances in the cartridge in thermal contact with the flow circuit of the coffee, so as to act as a thermal flywheel and therefore to allow a sufficient heat absorption when the coffee is supplied. Then, the heat accumulated in the gel or cold accumulating substance is gradually removed through the refrigerating circuit between one cold coffee supply operation and the subsequent one, or in any way during a period in which the supply of cold coffee from the machine is not required.

In general, when the cartridge uses a cold accumulating substance, alone or in combination with an active refrigerating system, the substance can be advantageously suitable to be subjected to a phase transition, with heat absorption from the outside, so that it can absorb quickly high quantities of heat released from the coffee without varying its temperature.

Further advantageous features and embodiments of the invention are set forth in the appended dependent claims and will be described in greater detail below with reference to some non limiting examples of embodiment of the invention.

A further object of the present invention is a method for producing cold coffee by means of a coffee machine, comprising the steps of:
 producing hot coffee by flowing hot water through an infusion unit;
 making the hot coffee flow across a refrigerating cartridge and collecting the cooled coffee in a cup or other container.

BRIEF DESCRIPTION OF THE DRAWINGS

The invention will be better understood by following the description below and the attached drawing, which shows a non-limiting practical embodiment of the invention. More in particular, in the drawing:

FIG. 3A shows a detail of the diagram of FIG. 3 with the switching valve in a different position for connecting the infusion unit to the dispensing nozzle and to the refrigerating cartridge;

DETAILED DESCRIPTION OF EMBODIMENTS OF THE INVENTION

Figure 1:
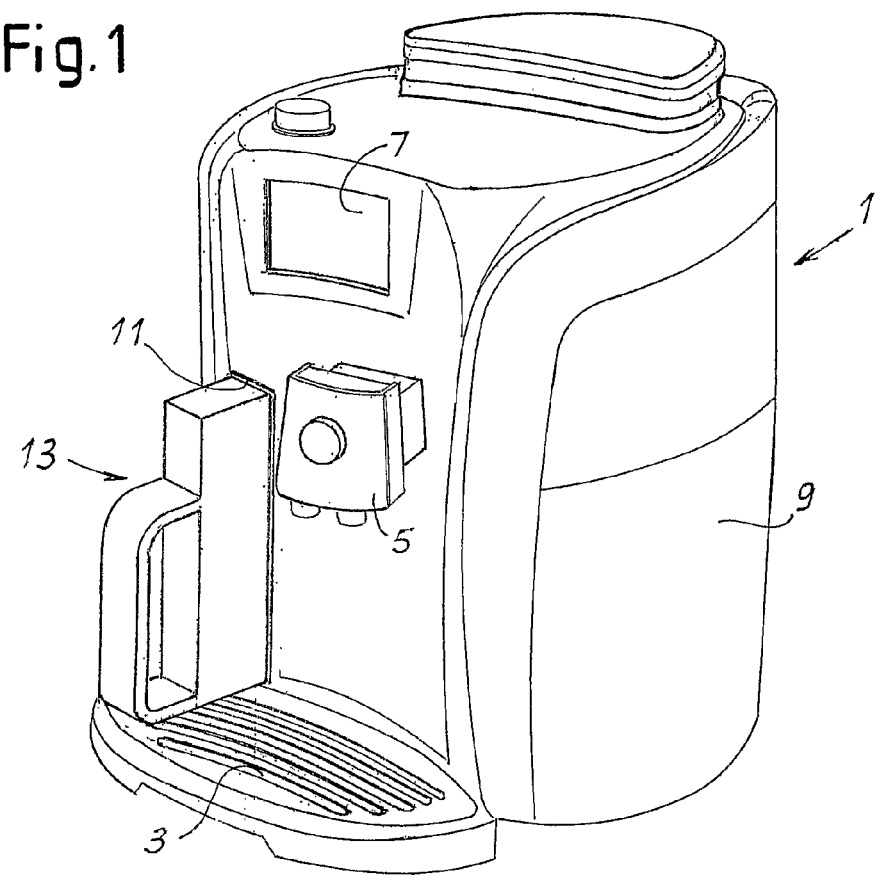
FIG. 1 shows an axonometric view of a machine for domestic use, provided with a refrigerating cartridge according to the invention.

FIG. 1 schematically shows a coffee machine for household use, to which the present invention can be applied. However, as mentioned in the foreword, the invention can be also embodied in machines of other type, for example automatic or semi-automat machines for professional use, as well as on so called vending machines or automatic dispensers, which can also be, as the case may be, of a particularly complex type and which can be designed to supply, in addition to coffee, further products such as for example both hot and cold beverages, solid food products such as snacks or the like, beverage packaged in cans or bottles etc. The following description, particularly referred to a machine for household use, must be therefore intended as a non limiting example for the numerous applications that the present invention can have.

In FIG. 1 the machine is indicated as a whole with the number 1. It has a rest surface 3 for the cups in which the coffee, that is usually supplied through dispensing nozzles 5, is collected. Reference number 7 indicates a generic user interface. This can be a touch screen or a display, to which buttons are associated, or any other type of suitable interface, which allows the user to give instructions to the machine regarding the type of beverage to be prepared.

Inside the machine, in a body indicated as a whole with the number 9, the usual members of coffee machines of this type are indicated, some of which will be described in greater detail hereunder with reference to FIG. 3. The housing or body 9 is provided with a front opening 11, within which a refrigerating cartridge, indicated as whole with the number 13 and described in greater detail hereunder, can be inserted.

Figure 3:
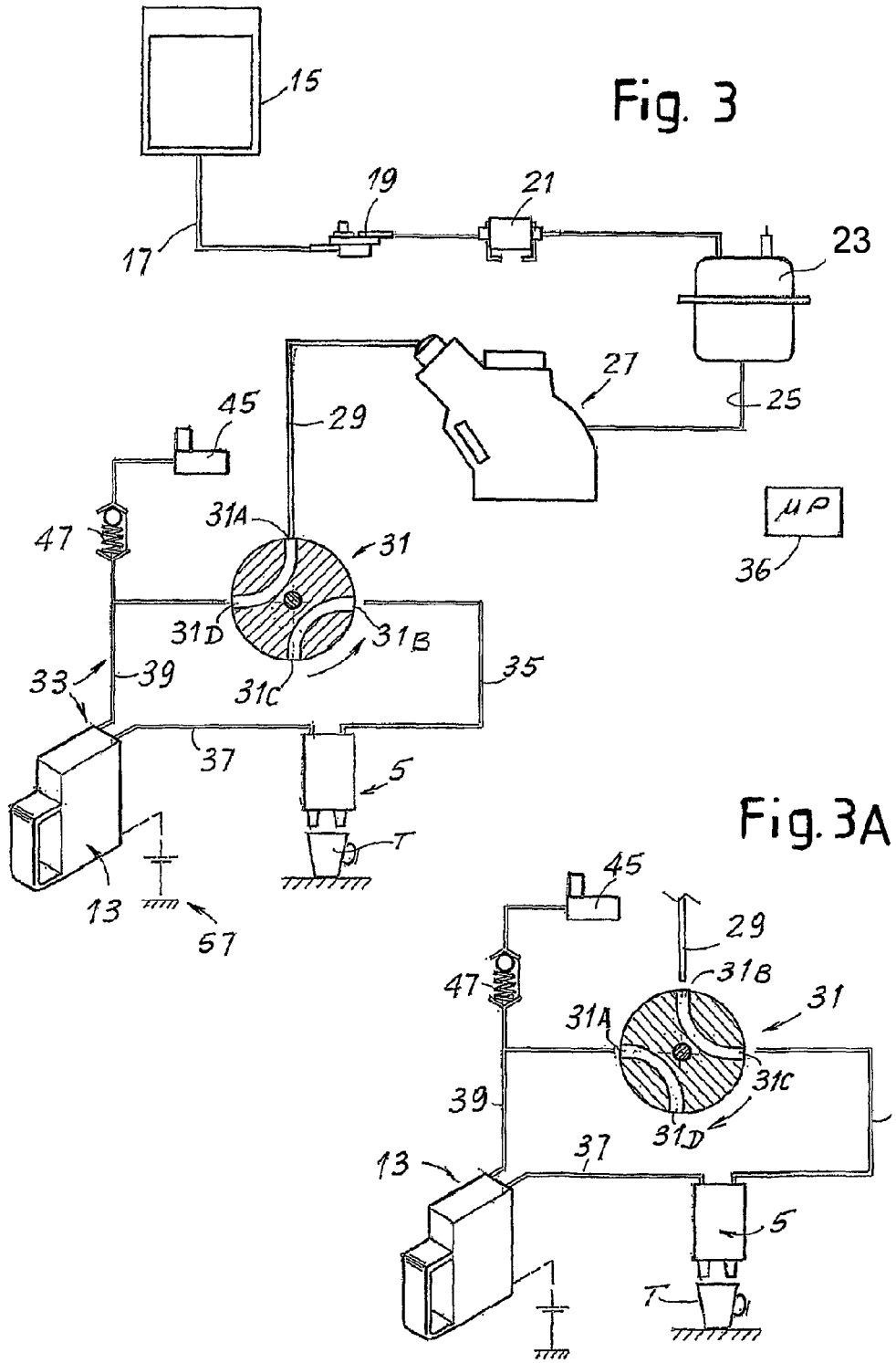
FIG. 3 shows a diagram of the hydraulic circuit of the machine.

FIG. 3 shows some of the components housed inside the machine 9, and in particular some components of the hydraulic circuit. It should be understood that inside the machine 9 other members, accessories, devices, equipment or other can be arranged, of a known type to produce other types of beverages, for example cappuccino, hot milk, latte macchiato, or to grind coffee beans etc. These further members or accessories are not interesting herein and therefore they will not be described or illustrated.

With reference to FIG. 3, inside the machine 1 a water tank 15 is arranged, with an outlet conduit 17 connected to a flow meter 19. The flow meter 19 can be a turbine flow meter or a flow meter of any other type. The water is sucked from tank 15 through a pump 21 which feeds it to a boiler 23. The outlet 25 of the boiler 23 is connected to an infusion unit 27, inside which an infusion chamber is arranged, which can be loaded with a capsule, a pod or a cartridge of coffee or other food product destined to form a beverage. In other embodiments the infusion unit 27 can be fed with coffee powder obtained through grinding of beans contained in a tank inside the machine (not shown) or it can be fed with coffee powder supplied directly by the user or taken from a container.

The infusion unit 27 is connected through a conduit 29 to a switching valve 31. This latter is designed, controlled and arranged in such a manner so as to put into communication the outlet 29 of the infusion unit 27 alternatively with the dispensing nozzles 5 or with an auxiliary circuit indicated as a whole with 33 and formed by the refrigerating cartridge 13, or to which the latter can be connected.

The switching valve 21 can be controlled manually or through an actuator controlled by an electronic control unit, indicated schematically with number 36 in FIG. 3. The control unit 36 is also preferably interfaced with the pump 21, with the flow meter 19, with the boiler 23 and with the infusion unit 27, so as to control in an automatic or semi automatic manner the infusion cycle according to criteria known by those skilled in the art. Depending upon the degree of automation of the machine, upon its complexity and upon the number of functions that it can perform, the control unit 36 can control one or more of the members mentioned above and any other member, device or accessory with which the machine can be provided, for example a frothing device (cappuccino maker) for producing frothed milk.

The switching valve 31 can take the one or the other of two alternative positions indicated in FIG. 3 and in FIG. 3A. The switching valve 31 has four inlet and outlet openings 31A, 31B, 31C, 31D. These latter put into communication the outlet 29 of the infusion unit 27 directly with the dispensing nozzles 5 or alternatively with the auxiliary circuit 33. In the position of FIG. 3 the outlet conduit 29 of the infusion unit 27 is in flow connection with the inlet 31A of the switching valve 31 and with the outlet 31D of the valve. The latter is connected with the auxiliary circuit 33, so that the hot coffee coming out from the infusion unit 27 enters through the switching valve 31 inside the auxiliary circuit 33. Vice versa, in the arrangement of FIG. 3A, the exit conduit 29 of the infusion unit 27 is connected, through the opening 31B and the opening 31C of the switching valve 31, to a conduit 35 for the connection to the dispensing nozzles 5. Therefore, in the arrangement of FIG. 3 the coffee flows through the refrigerating cartridge 13 and is supplied by it through a conduit 37 towards the dispensing nozzles 5 in the cup T. Vice versa, in the arrangement of FIG. 3A the auxiliary circuit 33 is not used and the coffee flows directly from the infusion unit 27 into the cup T through the openings 31B, 31C of the switching valve 31.

Figure 2:
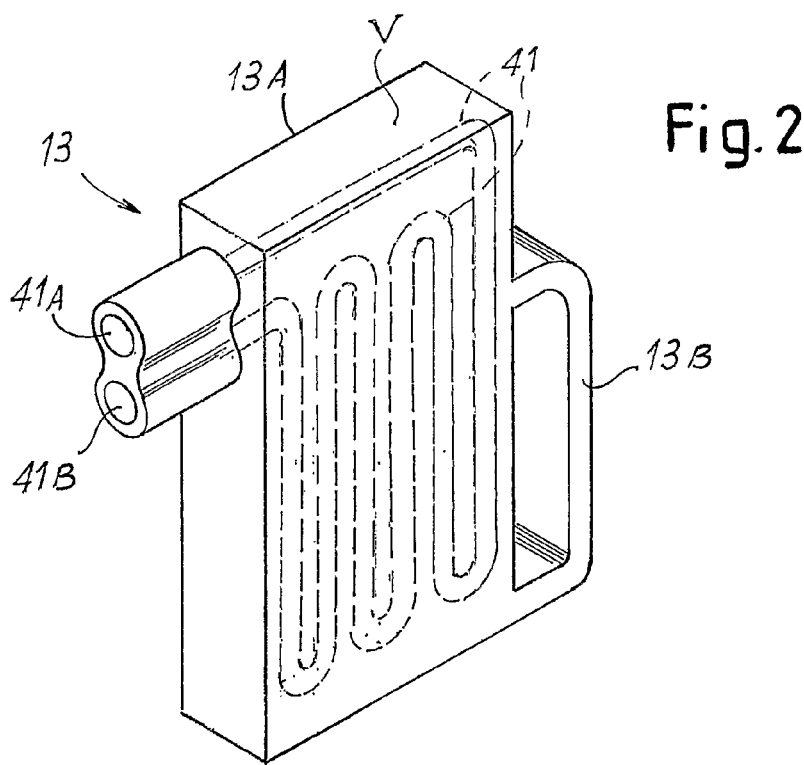
FIG. 2 shows an axonometric view of a refrigerating cartridge in one embodiment.

The refrigerating cartridge 13 can be designed in various ways. In some embodiments it has a body 13A, preferably provided with a handle 13B for a more comfortable handling. Inside the body 13A of the cartridge 13 a coffee flow conduit is arranged, which can have advantageously the shape of a coil and which is generally indicated in FIG. 2 with the number 41. The flow conduit 41 has an inlet with a joint 41A and an outlet with a joint 41B. The joint 41A can be connected through a conduit 39 of the auxiliary circuit 33 to the switching valve 31, whilst the exit joint 41B can be connected to the above mentioned conduit 37. In this way when the cartridge 13 is inserted in the machine, the joints 41A and 41B connect to the conduit 39 and to the conduit 37. The cartridge is therefore part of the auxiliary circuit, indicated as a whole with the number 33, which comprises the conduit 39, the cartridge 13, the conduit 37. Vice versa, when the switching valve 31 is in the arrangement of FIG. 3A, the cartridge remains inactive.

A volume V is provided inside the body 13A of the cartridge 13, which can be filled with a gel or other material or substance suitable to accumulate cold, for example a substance which changes phase in the time interval of interest, so as to absorb heat from the coffee flowing through the cartridge without changing temperature. These substances are known per se, and are used in many fields, such as for example for preserving foods inside coolers, in the medical field for keeping parts of the body hot or cold, and for other applications. The coil 41 is advantageously made of a material with a high thermal conductivity coefficient, for example aluminum or copper, adequately coated so as not to enter into contact with the food product. In this way, when the substance contained in the volume V has been adequately cooled by inserting the cartridge 13 for example in a deep freezer, the coffee flowing through the coil or flow conduit 41 releases its heat and becomes cooler, therefore arriving to the outlet conduit 41B with a temperature substantially lower than the production temperature of the infusion unit 27. By using a cartridge of adequate dimensions and adequate thermal inertia, at the exit of the cartridge a coffee can be obtained, whose temperature is equal to the temperature that can be obtained for example manually with a shaker, i.e. by mixing the hot coffee produced by the machine with ice cubes. The cold coffee thus obtained is supplied through the nozzles 5. Alternatively, the conduit 37 may be omitted and the exit joint 41B may be positioned in a different manner on the cartridge 13, for example it may project laterally so as to supply cold coffee directly into the cup T resting on the rest surface 3 (FIG. 1) of the machine 1. In other embodiments the exit joint 41B may be inserted on another conduit for supplying cold coffee from the machine, however not connected to the nozzles 5 but to another circuit.

In some embodiments, to obtain a cold coffee with cream, more similar to the shaken cold coffee which can be obtained through a manual process, the auxiliary circuit 33 can further comprise an air compressor 45, connected to the conduit 39 by means of a backflow valve 47. In this way the compressor 45, which can be suitably controlled by the programmable electronic control unit 36, can insert pressurized air in the coffee in an adequate point, preferably along the conduit 39, of the auxiliary circuit 33, so as to form a cream which is then present in the cold coffee coming out from the cartridge 13.

By dimensioning in an adequate manner the volume V of the refrigerating cartridge 13, the latter can supply an adequate number of cold coffees. However, this becomes progressively warmer due to the effect of the heat released from the coffee flowing in the flow conduit or coil 41 and also due to the effect of the cold loss, i.e. of heat absorption from the surrounding ambient through the walls of the cartridge 13. The latter will be preferably coated with an insulating material, but they cannot have a particularly high insulation degree due to the fact that this insulation hinders or slows the cooling process of the cartridge 13 in the deep freezer. It is also possible for the cartridge to be provided with a removable insulating system, which is applied when the cartridge is in use on the machine, but is removed when the cartridge is put in the deep freezer.

Figure 4:
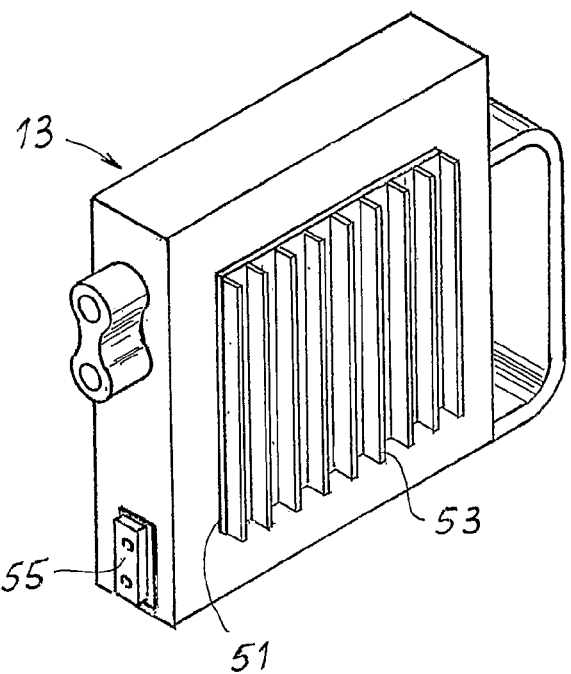
FIG. 4 shows an axonometric view of a cartridge with an active refrigerating device.

In some embodiments, to maintain the cartridge 13 cold for a longer time (or in any way to slow the phase transition of the heat absorbing material inside it) it is possible for the cartridge to be provided with active refrigerating means. According to some embodiments (see in particular FIG. 4) the cartridge 13 can be provided with active refrigerating systems comprising one or more Peltier cells 51, preferably provided with fins 53 for dispersing heat generated due to the Peltier effect by the cells 51. The latter can be powered through plugs 55 associated with the cartridge 13; these plugs, when the cartridge 13 is inserted in the machine 1, enter in contact with corresponding electric contacts contained inside the machine. In the diagram of FIG. 3 number 57 schematically illustrates an electric DC source powering the Peltier cell or cells associated with the cartridge 13 when it is provided with them as in FIG. 4.

In some alternative embodiments the Peltier cell or cells 51 can be fixedly arranged inside a housing 11 in which the cartridge 13 is completely or partially inserted. In this way the cartridge is more economic to be produced and therefore the user will bear a lower expense for buying also a great number of cartridges which can be maintained cold in a deep freezer and used each time.

Figure 5:
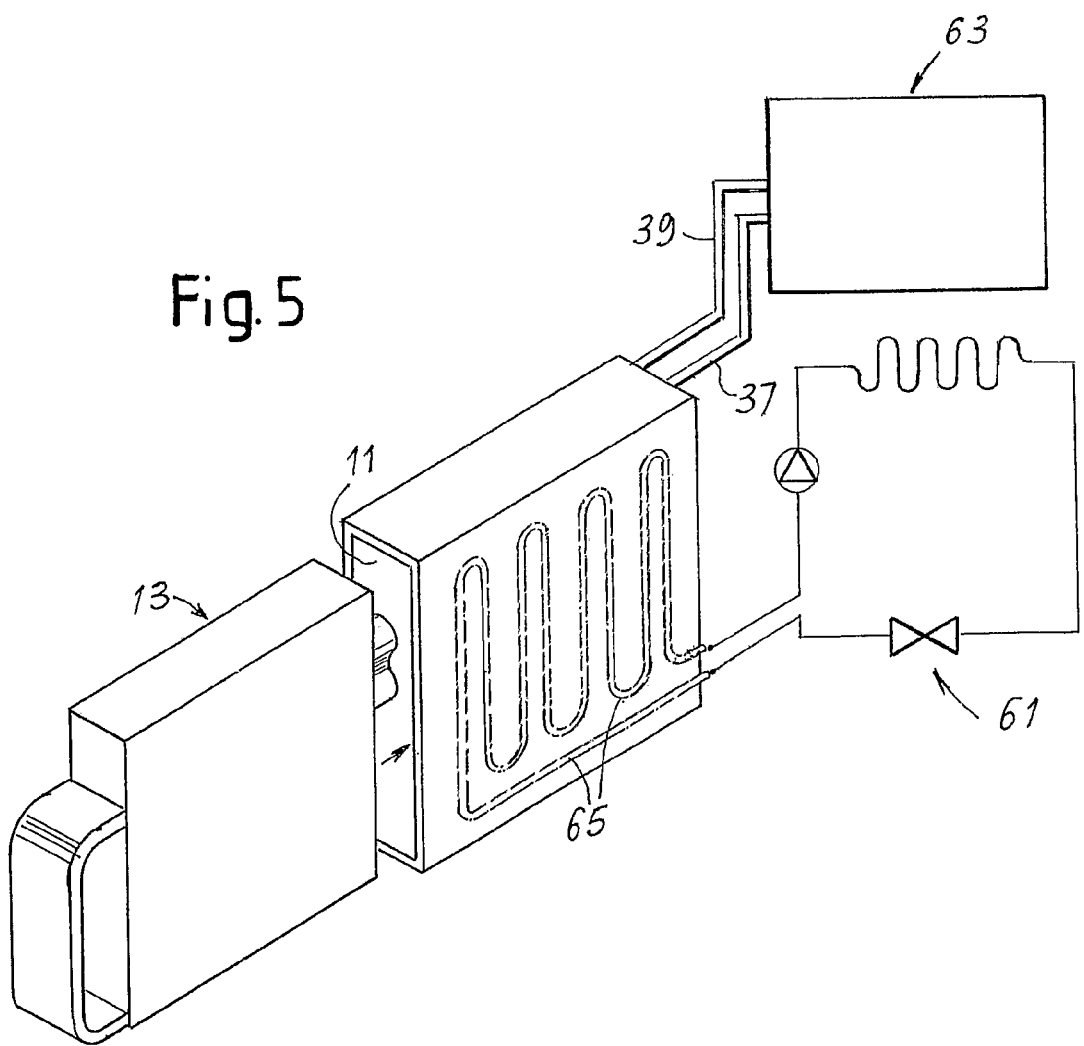
FIG. 5 shows a refrigerated housing for a refrigerating cartridge of the active or mixed type.

In alternative embodiments a housing 11 can be provided, cooled with a coolant of a refrigeration circuit. FIG. 5 schematically shows an embodiment of this type, wherein the refrigeration circuit is schematically indicated with the number 61. This can be a dedicated circuit or it can be the same circuit with which the machine is provided, for example in the case in which this latter is a vending machine which also provides for preserving and supplying cold beverages and/or foods maintained at low temperature. In the diagram of FIG. 5, the number 63 generically indicates a block in which the hydraulic components, illustrated in FIG. 3 and not shown in the simplified diagram of FIG. 5, are enclosed. Number 65 indicates a refrigerating coil, i.e. a heat exchanger in which the coolant of the circuit 61 flows. In this case, the cartridge 13 is inserted in the seat or housing 11 of the machine and it is maintained at a temperature lower than the ambient temperature thanks to the heat exchanger 65. This latter can be applied on one single face or preferably on two or more faces of the seat or housing 11 for a more efficient cooling.

With an adequate dimensioning of the Peltier cells 51 and/or of the refrigerating circuit 61 it is also possible to use the cartridge 13 devoid of the cold accumulating material inside its volume V. Alternatively, this material can be provided but only as a system of thermal flywheel, whilst the Peltier cells 51 and/or the heat exchangers 65 extract the heat released from the coffee flowing in the cartridge 13 and passing through the gel or other cold accumulating material contained inside the inner volume of the cartridge 13.

In some embodiments, especially in the case of automatic devices, the cartridges 13 can be stably inserted in the housing or seat 11 of the machine instead of being extractable to be inserted in a deep freezer.

It is understood that the drawing only shows an example provided by way of a practical arrangement of the present invention, which can vary in forms and arrangements without however departing from the scope of the concept underlying the invention. Any reference numbers in the appended claims are provided for the sole purpose of facilitating reading of the claims in the light of the description and the drawing, and do not in any manner limit the scope of protection represented by the claims.

The invention claimed is:

1. A coffee machine for producing coffee having a housing with an opening, the coffee machine comprising:
   a boiler;
   a pump coupled to the boiler;
   an infusion unit coupled to the boiler for receiving water from the boiler and having an output outputting hot coffee at an elevated temperature;
   an auxiliary circuit including a switching valve having a first channel between a first inlet and a first outlet of the switching valve for connecting the infusion unit to a nozzle for dispensing the hot coffee in a first state, wherein the auxiliary circuit is connectable to the output of the infusion unit through the switching valve for receiving the hot coffee and outputting cold coffee when the switching valve is in a second state; and
   a refrigerating cartridge removably insertable into the opening for connection to the auxiliary circuit and cooling the hot coffee flowing through the auxiliary circuit when the switching valve is in the second state for output of the cold coffee,
   wherein the switching valve has a second channel between a second inlet and a second outlet of the switching for directly connecting the infusion unit to the refrigerating cartridge in the second state.

2. The coffee machine as claimed in claim 1, further comprising a refrigerating device for extracting heat from said refrigerating cartridge.

3. The coffee machine as claimed in claim 2, wherein said refrigerating device comprises at least one Peltier cell.

4. The coffee machine as claimed in claim 2, further comprising a refrigerating device, wherein said refrigerating device comprises at least one heat exchanger connected to a circuit of refrigerating fluid of said refrigerating unit.

5. The coffee machine as claimed in claim 1, wherein the auxiliary circuit includes a coil shaped duct for input of the hot coffee and output of the cold coffee.

6. The coffee machine as claimed in claim 5, wherein said coil shaped duct comprises an inlet for the hot coffee, connectable to a joint of the auxiliary circuit for connection to the infusion unit, and an outlet for the cold coffee.

7. The coffee machine as claimed in claim 6, wherein said outlet is connectable to the nozzle of the coffee machine.

8. The coffee machine as claimed in claim 6, wherein said inlet is connectable to said infusion unit and said outlet is connectable to said nozzle by said switching valve being in the second state.

9. The coffee machine as claimed in claim 5, wherein said coil shaped duct is in thermal contact with a cold accumulating material.

10. The coffee machine as claimed in claim 1, further comprising a source of compressed gas connectable to said auxiliary circuit to inject compressed gas inside the auxiliary circuit.

11. The coffee machine as claimed in claim 10, wherein said source of compressed gas comprises an air compressor.

12. The coffee machine of claim 1, wherein the refrigerating cartridge includes a removable insulating system when the cartridge is in use in the coffee machine, the removable insulating system being removed when the refrigerating cartridge is stored in a freezer.

13. The coffee machine of claim 1, wherein the refrigerating cartridge includes a handle to facilitate removal of the refrigerating cartridge from the opening.

14. The coffee machine of claim 2, wherein the refrigerating device is automatically actuated in response to insertion of the refrigerating cartridge in the auxiliary circuit.

15. The coffee machine of claim 2, wherein the cold coffee is dispensed into a container from one of the nozzle of the coffee machine and an output of the auxiliary circuit.

* * * * *